March 16, 1954  F. F. MELVIN  2,672,006
BROOM RAKE
Filed May 19, 1953  2 Sheets-Sheet 2
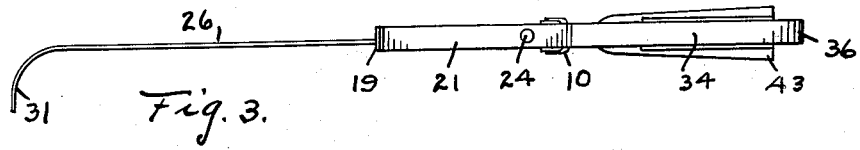
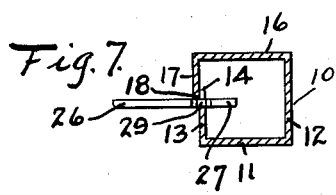
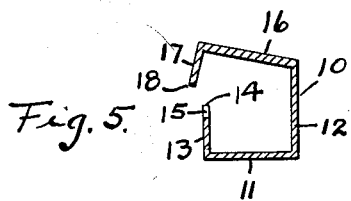
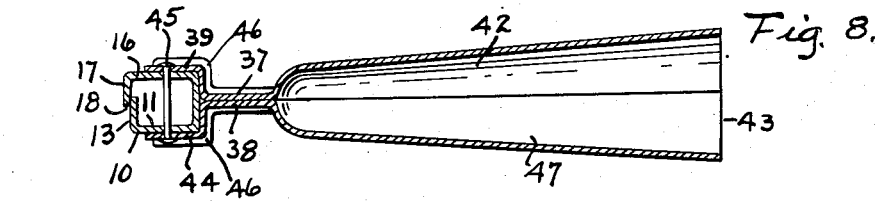
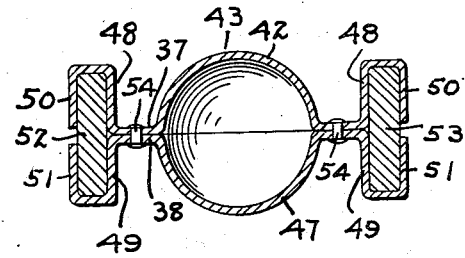
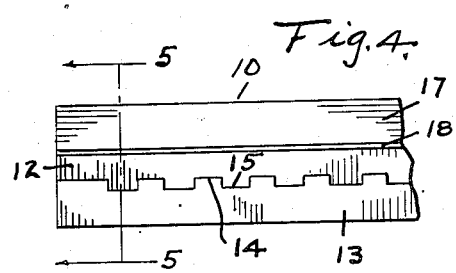
INVENTOR
FRANCIS F. MELVIN
BY Herbert A. Weinberg
ATTORNEY Patented Mar. 16, 1954

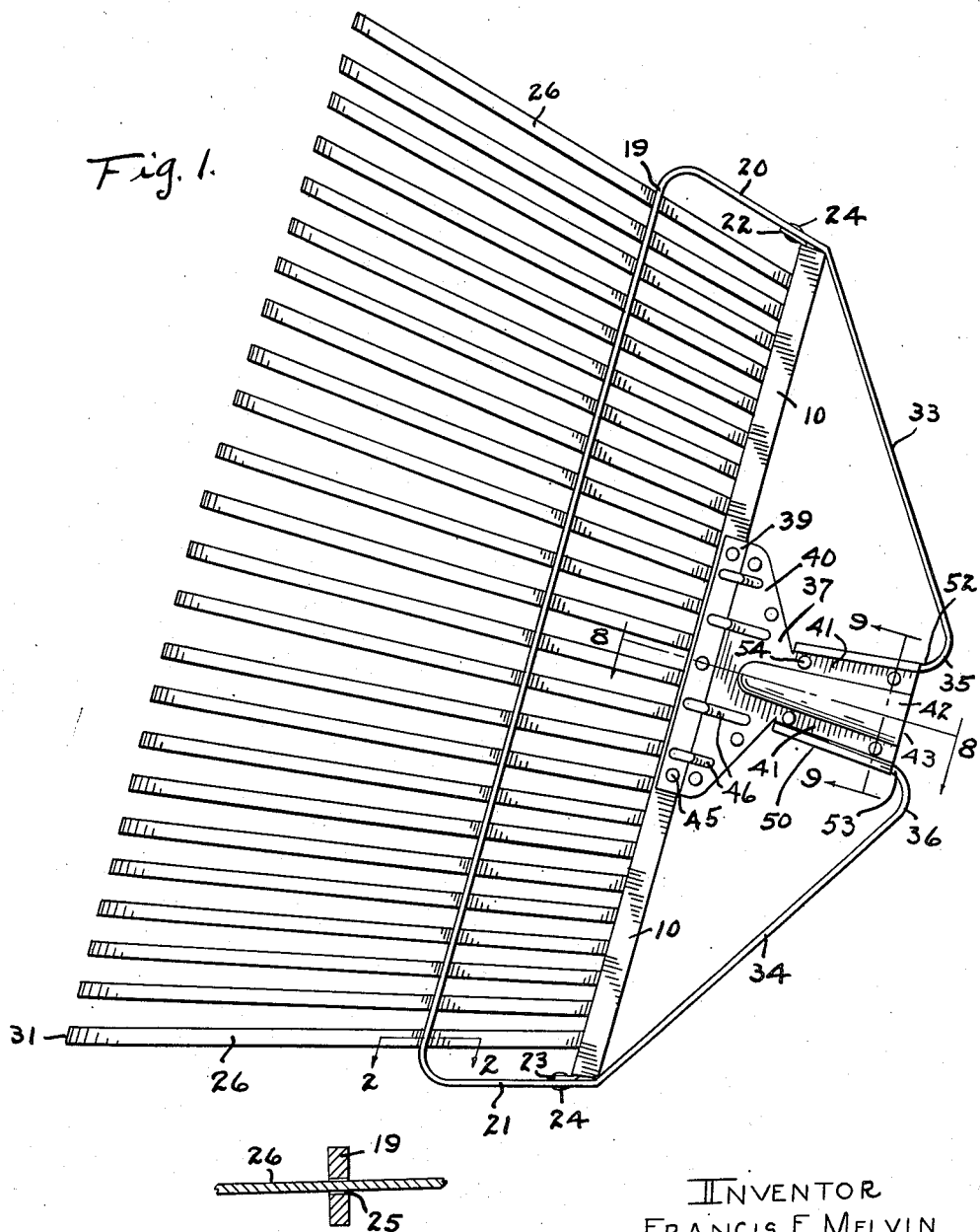

2,672,006

UNITED STATES PATENT OFFICE 2,672,006

BROOM RAKE

Francis F. Melvin, Elwood, Ind.

Application May 19, 1953, Serial No. 355,906

7 Claims. (Cl. 56—400.17)

This invention relates to a broom rake having a general framework carrying a plurality of spaced apart steel spring tines.

A primary object of the invention is to provide a long-life mechanical structure wherein the various members are secured one to the other with ample bracing particularly for the handle socket as well as for the mounting of the tines themselves.

A further important object of the invention is to provide a structure which may not only be of exceedingly long life and yet of medium weight, but in which the association of the various elements are such that the rake may be easily and readily assembled in production with maximum possible strength and the minimum number of operations.

These and many other objects and advantages of the invention will become apparent to those versed in the art from the following description of one particular form of the invention as illustrated in the accompanying drawings, in which Fig. 1 is a view in top plan of a broom rake embodying the invention;

Fig. 2 is a view in section on an enlarged scale on the line 2—2 in Fig. 1;

Fig. 3 is a view in side elevation;

Fig. 4 is a detail on an enlarged scale in front elevation of the rear tine end gripping frame member;

Fig. 5 is a view in transverse section on the line 5—5 in Fig. 4;

Fig. 6 is a detail in top plan and partial section of the frame member and tine assembly;

Fig. 7 is a view in transverse section on the line 7—7 in Fig. 6;

Fig. 8 is a view on an enlarged scale in section on the line 8—8 in Fig. 1; and

Fig. 9 is a view in section on a still further enlarged scale on the line 9—9 in Fig. 1.

A frame member generally designated by the numeral 10 is formed to have a generally box-like cross section wherein there is a floor 11, a back vertical wall 12, a front vertical wall 13, terminating in an upper edge 14, and along the edge there are notches provided designated by the numeral 15, these notches 15 being generally rectangular and spaced one from the other along that edge 14. There is a top wall 16 initially inclined upwardly from the back wall 12, Fig. 5, and from the front of the wall 16 there is downturned a partial wall 17, the under edge 18 of the wall 17 being normally spaced forwardly and above the edge 14 before assembly of the member into the rake.

A bar 19 is spaced forwardly of the member 10 by arms 20 and 21, which are bent around from the outer ends of the bar 19, and slope inwardly and rearwardly one in respect to the other to be secured by tongues 22 and 23 which are forwardly turned from the ends of the member 10, the attachment of the tongues 22 and 23 to the arms 20 and 21, being accomplished in any suitable manner, herein shown as by rivets 24.

The bar 19 is provided with a plurality of slots 25, Fig. 2, spaced one from the other along the length of the bar 19, there being a number of these slots 25 corresponding to the number of tines 26 which are to be assembled into the rake. In the present instance there are twenty-four of these tines 26, although this number may be varied depending upon the size of rake desired.

In each case, these tines 26 initially in flat lengths are provided with heads 27, Fig. 6, defined in each instance by notches 28 and 29 cut into the respective sides of the tines 26 from their edges. These notches 28 and 29 have longitudinal lengths in respect to the tines 26 sufficient to permit the neck 30 defined between the notches to be entered in the notches 15 in the member 10 to have the heads 27 placed within the member 10.

That is, these tines 26 are assembled by inserting the head ends thereof across the notches 25 in the bar 19 and carrying those heads on back through the opening between the edges 18 and 14 of the member 10 to have the necks 30 drop into the notches 15.

After that assembly, the upper wall 16 of the member 10 is pushed downwardly until it is in substantial parallelism with the floor 11, under which condition the front wall length 17 comes down on the front side of the wall 13 a distance to have the edge 18 bear on the top sides of the tines 26, the inner face of the wall section 17 being against the upper marginal portion on the outside of the upturned wall 13.

That is, when the upper wall 16 is pushed downwardly to complete the rectangular section as shown in Fig. 7, the edge 18 is compressively bearing against the top face of the tine 26 so that the tine is held rigidly in position relative to upper and downward movement. The tine 26 is thus held against longitudinal movement by reason of the head 27 being on the inside of the wall 13 and the neck 30 fitting within the notch 15. The tines 26 are held against lateral movement by reason of their insertion through the slot 25 in the bar 19 in each instance.

After all of the tines 26 have thus been assembled through the bar 19 and engaged in the member 10, the outer end portions 31 are formed in a suitable die to bend downwardly.

The arms 20 and 21 extend on beyond the tongues 22 and 23 to merge in an integral manner with the braces 33 and 34 which are in reality a continuation of the bar 19 having the same general cross sectional shape, and these sections 33 and 34 are carried diagonally rearwardly and inwardly one toward the other to extend through bends 35 and 36 into engagement with the ferrule forming plates 37 and 38.

The upper plate 37 is formed to have a lip 39 which overlaps the top side of the member 10, that is, it rests on the top wall 16 of the member 10. The plate has a triangular section 40 which merges into an extension 41 from which the upper section 42 of the ferrule, generally designated by the numeral 43, is pressed. The major portion of the extension 41 then comprises flanges extending outwardly from the sides of this upper half 42.

The lower plate 38 has a lip 44 which bears against the under side of the member 10, along a length of the floor 11. The plates 37 and 38 are brought into contact one with the other immediately back of the member 10 and extend together rearwardly. The lips 39 and 44 are secured in position against the member 10 by any suitable means, herein shown by through rivets 45, Fig. 8. Preferably reinforcing ribs 46 are formed to extend upwardly and downwardly from the respective plates 37 and 38 over the lips 39 and 44 and around the bends therefrom and across the plates 37 and 38 to form reinforcements throughout that area. The plate 38 extends rearwardly by an under section from which the lower half 47 of the ferrule 43 is pressed.

As indicated in Fig. 9, the plates 37 and 38 on each side of the ferrule 43 are carried oppositely by legs 48 and 49 in a common vertical plane from the outer ends of which the plate extends in each instance at right angles to those legs and thence is turned downwardly by the terminal legs 50 and 51 to form a channel which receives the terminal ends 52 and 53 of the bar sections 33 and 34 after they turn forwardly from the bends 35 and 36. The two plates 37 and 38 are secured together to form a rigid assembly by any suitable means, herein shown as by the rivets 54.

Thus the ferrule 43 is braced by these diagonally disposed sections 33 and 34, and their interconnections along the sides of the ferrule so that the ferrule together with its connections with the frame member 10 is very rigidly maintained in its connection therewith. This ferrule 43 of course receives a handle (not shown) in the usual manner.

By mounting the tines 26 in the manner above described, the bar 19 serves as a fulcrum as the tines may bend upon contact with the ground being raked so that the tines may bow between the bar 19 and the frame member 10, without being rigidly attached to the bar 19, so that the tines 26 are permitted more latitude in bending and do not have to have a rigid attachment at the bar 19 which would otherwise tend to stiffen the tines and promote breaking along that line. At no place is there any welding of the tines 26 to the supporting frame member 10 and the bar 19. Yet the tines are securely held against longitudinal as well as lateral and vertical displacement.

Therefore, while I have described the invention in the one particular form, this form being the one now best known to me, it is obvious that structural variations may be employed without departing from the spirit of the invention, and I therefore do not desire to be limited to that precise form beyond the limitations which may be imposed by the following claims.

I claim:

1. A broom rake comprising a box-like elongated frame member; a frame member front wall lower section of less height than that of the member and having a plurality of notches spaced one from the other entering from the section top edge; a frame member front wall upper section extending downwardly from the top of the frame member a distance less than said member height and overlapping said lower section across said notches; a bar extending across the forward side of said frame member; an arm extending from each end of the bar rearwardly and secured to said frame member spacing the bar in rigid position from the member; said bar having a plurality of slots therethrough spaced one from the other; a tine extending through each of said slots and rearwardly under said upper section and through each of said notches; said tine in each instance having a neck portion lying in each notch withholding the tine against longitudinal travel; said upper section bearing on said tines and holding them against lifting from said notches.

2. The structure of claim 1 in which a handle receiving ferrule carrying member is attached to said frame member; and brace members extend from the outer end portions of said frame member and engage with said ferrule member.

3. The structure of claim 1 in which said bar serves as a fulcrum over which said tines may freely bend on either front or rear side thereof; each of said notches being less in width than said tines; and each of said necks fitting against appreciable lateral movement in each notch.

4. The structure of claim 2 in which said brace members are integral extensions from said bar arms; and said brace member in each instance extending to the outer end portion of said ferrule member and thence forwardly therealong.

5. A broom rake comprising a frame member; a plurality of tines; a tine fulcrum member carried by said frame member; and a handle ferrule; said handle ferrule having channel brackets along its sides; an arm at each end of said fulcrum member extending therefrom to said frame member and bending inwardly and rearwardly from the frame member to the rear end portion of the ferrule brackets and thence turning forwardly into said brackets; said tines being slidingly carried by said fulcrum member and engaged by rear ends to said frame members.

6. The structure of claim 5 in which said tine rear ends have abutments thereon; and said frame member clamps on said tines effecting said engagement and holding the tines through said abutments against longitudinal travel.

7. The structure of claim 5 in which said fulcrum member is provided with a slot therethrough for each of said tines, the tines extending slidably through the slots.

FRANCIS F. MELVIN.

No references cited.